United States Patent
Gschwind et al.

(10) Patent No.: US 6,948,082 B2
(45) Date of Patent: Sep. 20, 2005

(54) METHOD AND APPARATUS FOR SOFTWARE-ASSISTED THERMAL MANAGEMENT FOR ELECTRONIC SYSTEMS

(75) Inventors: Michael Karl Gschwind, Chappaqua, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 10/150,270

(22) Filed: May 17, 2002

(65) Prior Publication Data
US 2003/0217297 A1 Nov. 20, 2003

(51) Int. Cl.[7] .................................................. G06F 1/32
(52) U.S. Cl. ....................... 713/320; 713/300; 713/322; 713/323; 713/324
(58) Field of Search ................................ 713/300, 320, 713/322, 323, 324

(56) References Cited

U.S. PATENT DOCUMENTS

| | | | | |
|---|---|---|---|---|
| 5,498,971 A | * | 3/1996 | Turnbull et al. | ............ 324/760 |
| 5,870,614 A | * | 2/1999 | Ang | ............................ 713/320 |
| 6,427,211 B2 | * | 7/2002 | Watts, Jr. | ..................... 713/320 |
| 6,496,346 B1 | * | 12/2002 | Bruckner | ..................... 361/103 |
| 6,535,798 B1 | * | 3/2003 | Bhatia et al. | ................ 700/293 |
| 6,630,754 B1 | * | 10/2003 | Pippin | ......................... 307/117 |
| 6,718,474 B1 | * | 4/2004 | Somers et al. | ............... 713/322 |

OTHER PUBLICATIONS

Gunther et al., "Managing the Impact of Increasing Microprocessor Power Consumption", Intel Technology Journal Q1, 2001, pp 1–9.
"Intel® Pentium® 4 Processor In the 423–pin Package Thermal Design Guidelines", Intel Order No.: 249203–001, Nov., 2000.

\* cited by examiner

*Primary Examiner*—Lynne H. Browne
*Assistant Examiner*—James K. Trujillo
(74) *Attorney, Agent, or Firm*—Satheesh K. Karra; Harrington & Smith, LLP

(57) ABSTRACT

In a computer system, a device for measuring power dissipation (e.g., using on-die thermal sensors) is linked to both a hardware-based thermal management solution and with a means for causing a notification event to software, so that, initially, the operating system software and/or the application software modifies its behavior in response to the notification event to reduce overall system power dissipation and the hardware-based thermal management solution is only triggered if the software solution is not effective; with both operating system and application software resuming higher-performance algorithms when power dissipation is no longer critical.

26 Claims, 6 Drawing Sheets

US 6,948,082 B2

METHOD AND APPARATUS FOR SOFTWARE-ASSISTED THERMAL MANAGEMENT FOR ELECTRONIC SYSTEMS

BACKGROUND OF THE INVENTION

1. Field of the Invention

The present invention generally relates to power and power-density management in microprocessors, and more particularly to a method and apparatus for a power and thermal management employing software and hardware components.

2. Description of the Related Art

In the last decade, the microprocessor power dissipation has gone up by a factor of ten. The frequency of operation of CMOS devices has increased ten fold. While the input voltage and capacitance of devices has decreased, the number of devices on a typical microprocessor die has increased by an order of magnitude. Moreover, device miniaturization has led to integration of cache contained at a multi-chip level to one contained on the microprocessor die. This has resulted in high CPU core power density—e.g., 50% of a 20 mm by 20 mm micro-processor die may contain the CPU core, with the rest being cache. The total power dissipation from such a microprocessor has reached 100 W, and the power density is estimated to be 40 W/cm$^2$. Extrapolating the changes in microprocessor organization and device miniaturization, one can project future power dissipation density of 200 W/cm$^2$!

Already, power dissipation presents a major limitation on the design of high-performance microprocessors. While power dissipation in processors such as the IBM POWER4™ it is still comfortably within the limits of the packaging/cooling solution of choice for a high-end microprocessor systems, such solutions are undesirable in lower end systems, such as most personal computers, game consoles, set top boxes and similar devices, due to:

Total packaging/cooling solution cost, due to increased package cost, the need for fans, heat spreaders, thermal interface materials etc.

The possible need for a fan which induces noise and can lead to reduced meantime between failure, The inability to guarantee a controlled environment for the system as is usually provided for high-end systems, including possible obstruction of fan vents, etc.

Thus, power removal, i.e., thermal management of the processor, is an increasingly challenging aspect of packaging as the average power density of processors is expected to increase. The problem will be exacerbated by the need to manage local power densities on die. The development of cost-effective and technically viable thermal management solutions that maintain die temperature at acceptable levels will be key to ensuring future success. This can be accomplished through development and deployment of effective spreader solutions and thermal interface materials. Controlled assembly processes to manage the thermal interfaces are also a key to successful design. Finally, understanding and managing the die power, power distribution, and the thermal environment in the chassis are important.

To date, most packaging solutions have been designed for extended periods of operation in the thermal worst case. However, during normal operation, even high performance systems do not reach these conditions, let alone sustain them for extended periods of time. Thus, thermal solutions found in most systems are unnecessarily conservative and expensive for the most common operating conditions. However, such a design point does prevent catastrophic failure in the event of unexpected workload conditions.

Current microprocessors have only limited ways of responding to overheating (if any at all). State of the art systems like the Pentium 4 use dynamic clock throttling to reduce the danger of catastrophic failure due to power dissipation. However, this degrades applications in unplanned for ways. In many instances, an application could react better to reduce power if it were aware of the situation (e.g, by reducing detail in a game) instead of slowing down overall performance such as to be unresponsive.

FIG. 1 shows application power dissipation estimates for the Intel Pentium 4 processor. In this figure based on "Pentium 4 Processor Thermal Guidelines", Intel has estimated the power dissipation of a number of popular software applications. This method was based on extracting sequences from the programs and calculating the power consumed if that program were to be run on a Pentium 4 processor. Code sequences, or traces, were gathered from roughly 200 applications and benchmarks.

The packaging solution used for the Intel Pentium 4 provides an alternative approach to thermal management—the thermal design point for the packaging and cooling solution is at 75% of maximum power, which represents the range of power dissipation observed during system simulation for a variety of traces.

To prevent catastrophic failure, the system includes a Thermal Monitor feature that may be used in a variety of ways, depending upon the system design requirements and capabilities. At a minimum, the thermal control circuit supplies an added level of safety against loss in processor availability due to an over temperature situation.

Intel's thermal management in Pentium 4 relies on a mechanism referred to as "STOPCLOCK", wherein the clock is temporarily halted to reduce power dissipation to within the range supported by the packaging/cooling solution. There is additional support for raising software interrupts and access to device registers indicating when a thermal spike is encountered. FIG. 2 illustrates the operation of a simple hardware-only solution to thermal control based on the STOPCLOCK mechanism according to prior art.

While this solution represents an adequate response to prevent catastrophic failure, its impact on system performance can be quite undesirable. In particular, increased system temperature can lead to the random reduction of system performance, and wreak havoc on the system, leading to erratic behavior.

Thus, what is needed is an appropriate integration of software into thermal management, such that system behavior is a tool of thermal management and can aid in managing system power dissipation. This is particularly important when component cost is a concern, since it allows cheaper packages and other components (such as cooling systems) to be used while preserving acceptable user-experience (i.e., graceful situation-adapted degradation instead of brute force performance reduction)

SUMMARY OF THE INVENTION

The invention relates to integration of software and hardware components in the response to thermal management events.

A feature of the invention is the provision of a sensor for measuring power dissipation linked with both a hardware-based thermal management solution and with a means for causing a notification event to software.

Another feature of the invention is the adaptation of operating system software behavior to reduce overall system power dissipation in response to the notification event, in preference to a hardware solution. Yet another feature of the invention is the adaptation of application software behavior to reduce overall system power dissipation in response to the notification event, in preference to a hardware solution.

Yet another feature of the invention is the provision of notification that power dissipation is no longer critical.

DETAILED DESCRIPTION

Figure 1:
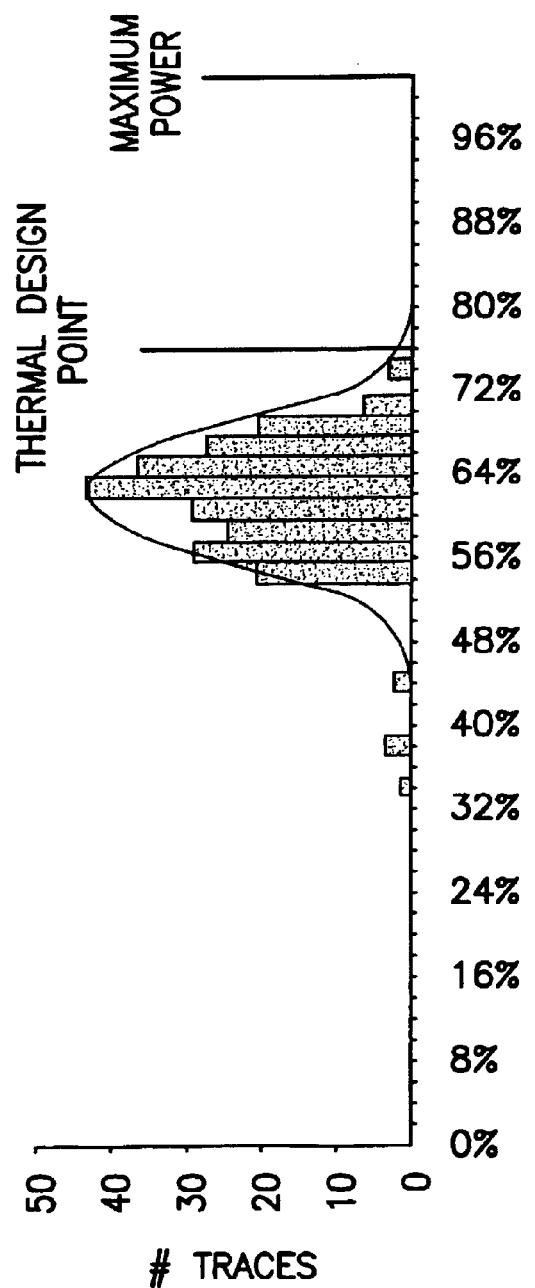
FIG. 1 shows the design point of an aggressive packaging/cooling solution in accordance with the prior art.

Referring again to FIG. 1, processor power dissipation simulations indicate a maximum application power in the range of 75% of the maximum power for a given frequency. Therefore, a system designed to the thermal design point, which has been set to approximately 75% of the maximum processor power would be very unlikely to see the thermal control circuit active and experience the associated performance reduction.

Figure 2:
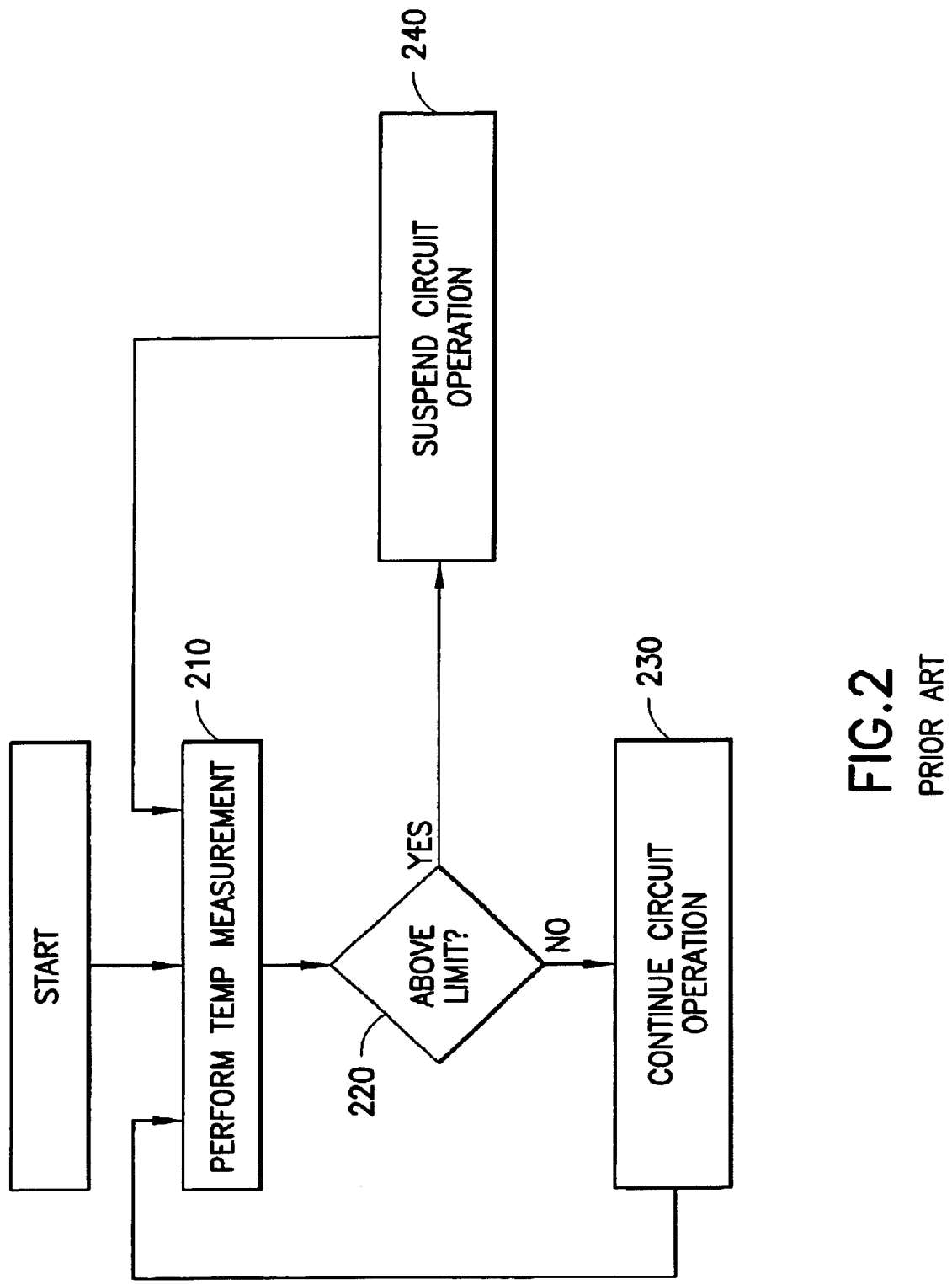
FIG. 2 shows a prior art hardware thermal management solution in conjunction with the design point of FIG. 1.

In step 210 of FIG. 2, a temperature measurement (or power measurement, or similar measurement which can be used to determine critical or non-critical operation) is obtained. For the purposes of the attached claims, the term "sensor means" includes apparatus for counting instructions executed per unit time and other indirect methods of measuring the temperature and/or power, as well as apparatus for measuring temperature directly and apparatus for measuring power dissipation (e.g. measuring current draw at a known voltage). The term "sensing" and variations includes measuring current and calculating power consumption as well as counting instructions and other indirect methods. In step 220, the measurement is compared to a threshold value. If the obtained measurement of a thermal property (temperature or power dissipation) is below the activation threshold value for triggering the thermal control circuit, control transfers to step 230. Otherwise, control is transferred to step 240.

In step 230, the microprocessor executes instructions for one or more cycles, and transfers control to step 210 for another measurement.

In step 240, the microprocessor activates the STOP-CLOCK mechanism for one or more cycles, and transfers control to step 210. This method is effective in avoiding catastrophic failure, but depending on the application software running, there may be a significant affect on the user experience; e.g. slowing down the rendering of a frame in a drawing program or of the action in a game.

Referring again to FIG. 1, it can be seen that a more aggressive thermal design point of 66% of maximum power will affect a noticeable number of traces and therefore a hardware cutoff using that point is likely to be noticed. However, this may allow an even cheaper packaging/cooling solution, e.g., for a low-cost, high-volume set-top or game console platform targeted at specific workloads. A system designer may consciously accept that some applications may not be able to run at their full performance potential due to the power-dissipation constraints.

Preferred Embodiments

The prior art is limited to hardware response to thermal control situations, wherein a trigger activates a hardware mechanism to reduce power dissipation in order to reduce temperature to acceptable levels. Since the hardware solution is not connected with the operation of the software in such a system, only simple solutions to a thermal emergency are possible, typically coupled with significant performance loss. This can translate into erratic system performance. Those skilled in the art will appreciate that a better response to thermal crises may be possible when software is notified and collaborates in power reduction, e.g., by reducing frame rates, level of detail, or switching to more power-efficient algorithms. Furthermore, software can be written to adapt to an expected loss in processor performance when adequately notified and adapt behavior to ensure graceful degradation.

According to the present invention, thermal control is performed with software assistance. In particular, hardware is adapted to generate notification events for software to request a reduction in power-intensity by software, or to notify software when less power-efficient algorithms can be employed again. Preferably, the invention is practiced in conjunction with a hardware-based thermal control circuit that will activate when software-based approaches are insufficient to reduce power dissipation to acceptable levels, or, in the case of software malfunction, to prevent catastrophic system failure.

Figure 3A:
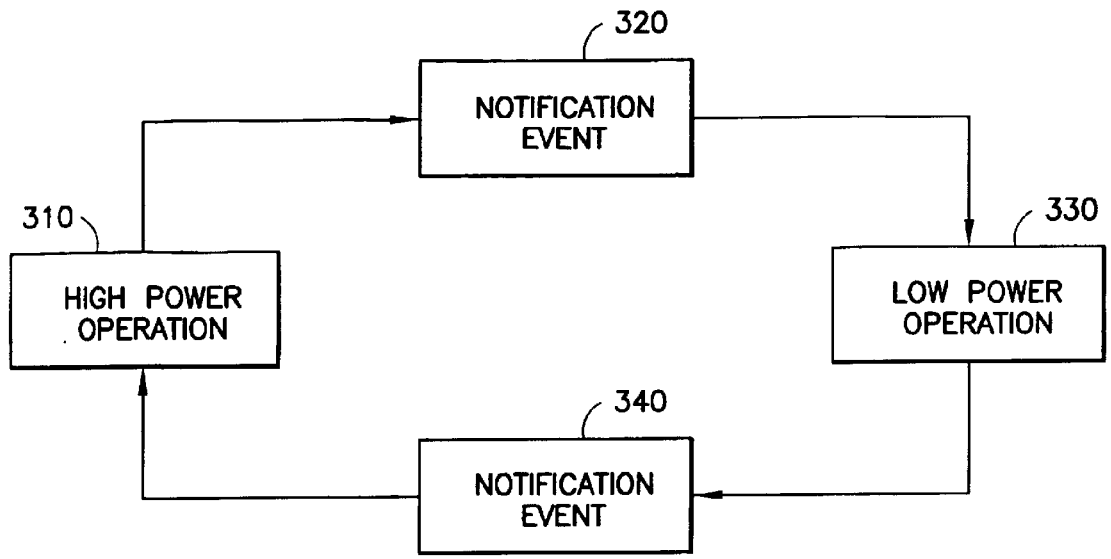
FIG. 3 shows a transition diagram for software-controlled thermal management.

Referring now to FIG. 3A, there is shown a transition diagram for a software-controlled thermal management in accordance with the present invention, which can be used in conjunction with the any convenient thermal design point.

The system starts operation in performance-optimized state 310. When a power (thermal or similar) sensor indicates that a first reference value c1 has been exceeded, it triggers a notification event 320 to software, and software adapts software algorithms and parameters to reduce the power of the system. The system then enters a state 330 of power-optimized software operation.

The notification event 320 can be embodied in many ways. In one embodiment, the notification event is represented by a processor exception or interrupt. In a variation of this embodiment, additional status information is provided with the exception or interrupt, e.g., by storing the exact temperature measurement obtained at the time of the notification event in a status register or by allowing the program to query a special status register to obtain an exact temperature measurement at the time when the status register is polled.

In another embodiment, the notification event is represented by polling a register, with either the operating system or the application program being responsible for periodically polling the register. In a first alternative, the information is a single bit representing a status of either "hot" or "cold". In another embodiment, the status register represents a sliding scale, e.g., the exact temperature measurement, or multiple measurement ranges, e.g., less than 50° C., 51–100° C., 101° C.–120° C., 120° C.–130° C., more than 130° C. All of the foregoing embodiments of changing the state of a register, asserting an interrupt, etc. are included within the term "notification event". The actions of writing to a register, asserting an interrupt, or setting a value of a parameter in any medium that the CPU can write to, whether or not it fits the definition of a register, will be referred to as "asserting a notification event". Terminating an interrupt, writing a parameter that is below a restoring value will be referred to as "withdrawing" the assertion of a notification event. The data—from a single bit to the number representing temperature or power dissipation will be referred to as a parameter representing a notification event. Software can respond to the notification event by adapting its behavior immediately to modify its power dissipation, deferring adaptation to a later time (e.g., when the program is in a critical program region it may defer modification until a non-critical region is reached, or until a point when change between different algorithms can occur seamlessly), or ignore a notification event (e.g., either due to a particular program not being adapted to understand the notification event, a safety-critical program being unable to reduce power-dissipation without compromising safety, or a program containing at least one "bug" (software defect)).

The notification event can be further refined to contain information about particular chip regions (either within a microprocessor, or in a system-on-a-chip) that have reached or exceeded a certain thermal threshold, the program being adapted to modify its behavior to use less of a particular resource "resource allocation", (e.g., a notification event indicating the floating point unit has reached unacceptable thermal level can cause an algorithm to be selected which uses integer instructions to perform a similar function.) Further, the low power operation or state can be implemented in many ways:

In one embodiment, the software is adapted by disabling the execution or reducing the execution frequency of at least one algorithm, or sub-algorithm (e.g., a graphics rendering program may disable anti-aliasing logic during rendering, or polygons may be drawn without shading to reduce computational complexity).

In another embodiment, the software substitutes at least one (power-saving) algorithm for another algorithm, the two algorithms differing in computational complexity (e.g., a different shading algorithm may be selected, the lower power shading algorithm offering less realistic shading of objects).

In another embodiment, the parameters are changed in at least one algorithm to reduce power dissipation (e.g., a video playback program may adapt frame rate and resolution, thereby lowering image quality but allowing continued and uninterrupted playback; a game may reduce intensity of game play, the level of detail with which objects are drawn and the number of objects drawn in the game, the sophistication of game AI algorithms, etc.; a graphics rendering program may reduce the resolution of objects rendered). The response of an algorithm to the notification may take a number of forms, e.g., the algorithm may implement adaptation immediately; with a delay optionally based on program logic to select an optimal point for adaptation; ignore the notification; or respond to it in accordance with a priority level which may be associated with a notification event. These various approaches will be referred to generally as substituting a step or modifying a step in a method. The term "modify execution" or "modify a method" will include suspending a program, slowing execution through software (as opposed to a hardware approach), dropping an algorithm, substituting a power-saving algorithm, changing a parameter so that the algorithm consumes less power, etc. The term "substituting" with respect to algorithms will be understood to include replacing one block of code with another, modifying an algorithm, the bulk of which is unchanged, to consume less power, and also changing the value of a parameter that affects the intensity of computing, e.g. the level of detail.

If the system is in state 330 and the sensor indicates that power (temperature, or similar) measurements have fallen below a restoring value $c_1'$, then a notification event 340 occurs, and system software re-enters a high-performance mode of operations. The threshold $c_1'$ can be set to the same value of $c_1$, or hysteresis can be used to change frequent switching between states 330 and 310 when the system operates close to this threshold.

Figure 3B:
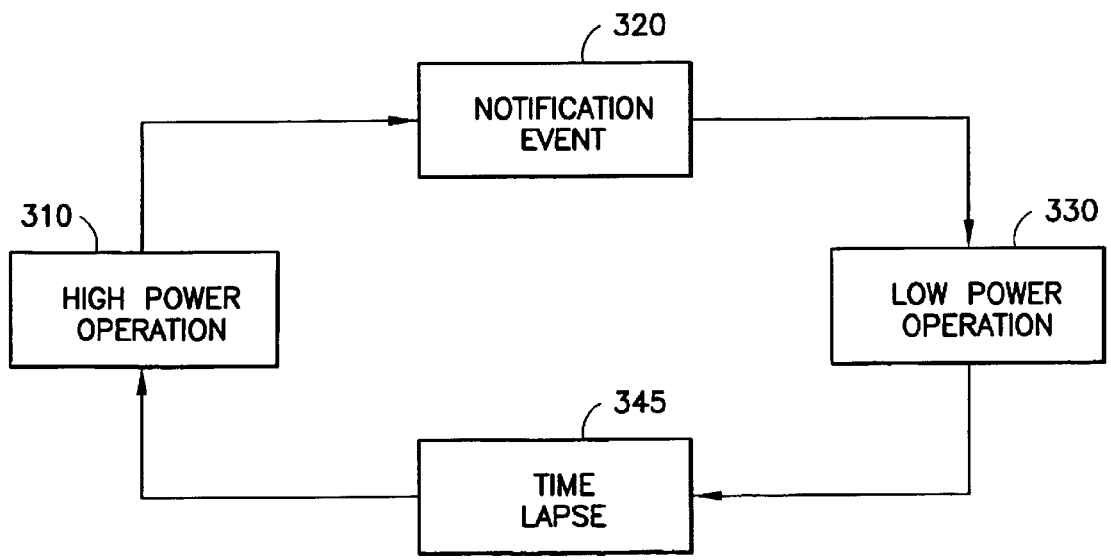

Those skilled in the art will appreciate that threshold $c_1'$ and the associated notification event can be replaced with a time-out mechanism, whereby a state transition automatically occurs from state 330 to 310, and when the threshold is still exceeded, a new notification event will re-activate a more power-optimized state. This option is illustrated in FIG. 3B with time lapse 345 substituted for notification event 340. In accordance with this embodiment, a variety of non-temperature related criteria can be used to return to a more power-intensive mode of operation exhibiting other desirable qualities (such as performance, level of detail, image or sound quality, etc.). In one such embodiment, a transition occurs when a new data or program section is entered (e.g., a new video track is displayed or a next level of game play is reached). In another embodiment, a transition occurs when the operating system performs a scheduling operation. In one embodiment, program logic computes an expected reset time-out dynamically to predict when a switch to a more power-intensive mode of operation exhibiting other desirable qualities may be feasible. This prediction can be based strictly on observation of previous time-out periods, or on a model of actual program behavior.

In alternative embodiments, a system may not be able to adapt software algorithms for lower power during all modes of operation, and the system may hence decide to ignore one or more notification events. In such a case, the system designer may also decide to defer adaptation to a later time when a point when switching is possible has been reached. (e.g., the completion of the execution of a defined algorithm, the rendering of a complete frame, an appropriate checkpoint where adaptation can be performed) when time slack in the system is available to allow the adaptation to be performed.

Thresholds $c_1$ and $c_1'$ may be selectable by software, e.g., to enable earlier or later notification events 320 and 340 depending on the time needed to adapt program behavior. There may also be multiple levels of software and hardware thresholds, each corresponding to separate notification events and progressively triggering more aggressive power reduction actions.

Figure 4:
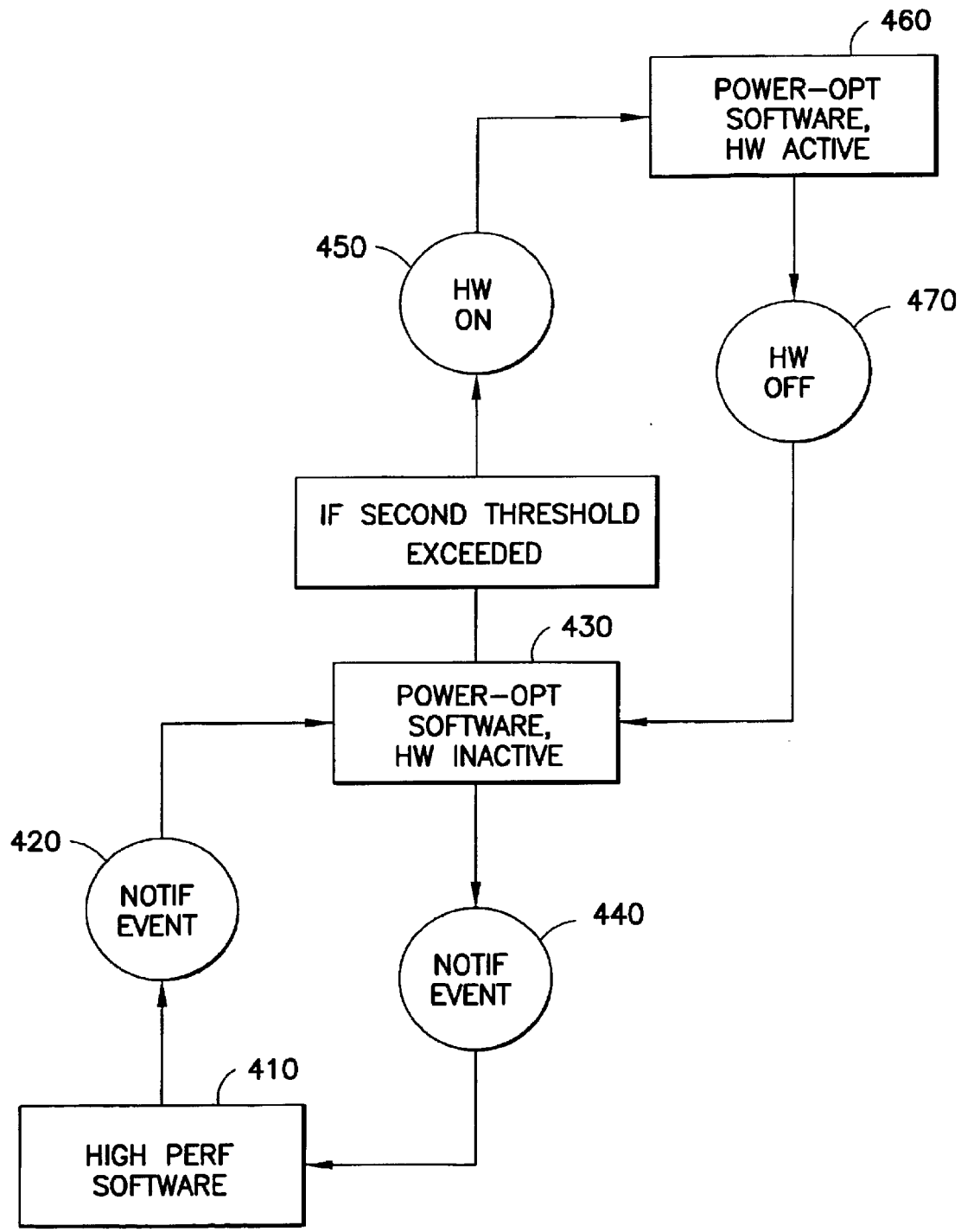
FIG. 4 shows a transition diagram for a hybrid hardware/software-based thermal management.

Referring now to FIG. 4, there is shown a transition diagram for hybrid software/hardware thermal management in accordance with the present invention. The system starts operation in performance-optimized state 410 with hardware thermal management inactive. When a power (thermal or similar) sensor indicates that a first critical threshold c I has been exceeded, it triggers a notification event 420 to software, and software adapts software algorithms and parameters to reduce the power of the system. The system then enters a state 430 of power-optimized software operation with hardware thermal management inactive.

If the system is in state 420 and the sensor indicates that power (temperature, or similar) measurements have fallen below a threshold $c_1'$, then a notification event 440 occurs, and system software re-enters a high-performance mode of operations. The threshold c1' can be set to the same value of c1, or hysteresis can be used to change frequent switching between states 430 and 410 when the system operates close to this threshold.

If the system is in state 430 of power-optimized software operation with hardware thermal management disabled and a power (thermal or similar) sensor indicates that a second critical threshold c2 has been exceeded, it triggers activation 450 of hardware thermal management and the system then enters a state 460 of power-optimized software operation with hardware thermal management enabled.

If the system is in state 460 and the sensor indicates that power (temperature, or similar) measurements have fallen below a threshold c2', then it triggers deactivation 470, and system software re-enters state 430 of power-optimized software operation with hardware thermal management disabled. The threshold c2' can be set to the same value of c2, or hysteresis can be used to change frequent switching between states 460 and 430 when the system operates close to this threshold. Alternatively, thresholds c1' and c2' and the associated events can be replaced with a time-out mechanism, so that a state transition automatically occurs from state 460 to 430, or state 430 to 410. If the threshold c1 is still exceeded, a new notification event will re-activate the more power-optimized state.

Those skilled in the art will appreciate that a system may not be able to adapt software algorithms during all modes of operation, and the system designer may decide to ignore one or more notification events. The system may also defer adaptation to a later time when the switching is not obtrusive (e.g., the completion of the execution of a defined algorithm or the rendering of a complete frame), when the user can be expected to want to pause to review the result just presented.

As was the case with the embodiment of FIG. 3, thresholds c1, c1', c2 and c2' can be selectable by software, e.g., to enable earlier or later notification events 420 and 440 depending on the time needed to adapt program behavior. Thresholds c2 and c2' are preferably not modifiable by ordinary programs since inappropriate changes may lead to catastrophic failure. There may be multiple levels of software and hardware thresholds, each corresponding to separate notification events and progressively triggering more aggressive power reduction actions. The execution of several steps can occur in parallel, in particular, but not limited to, those steps having to do with the execution of an algorithm and the monitoring for a notification event.

The term "notification event" is meant to be used generally—from simply writing data into a designated register or memory location (with software responsible for checking the data periodically), to asserting an interrupt signal that forces the currently operating program to stop its normal operation. The software designer will have the choice of actions to take to reduce power consumption. The designer of a multi-tasking operating system may set up a priority list of programs that operate simultaneously in normal conditions and will be turned off in sequence when the temperature is too high. (Alternatively, the designer may set up a procedure to permit the end user to choose the priority.) The designer of an application program will have the burden of setting up an option list of things that can be dispensed with. In the case of a video game, the designer will probably drop the rendering of background details first, simplify the details on the characters later and slow down the action last.

It is a feature of the invention that three groups of people may be involved in an implementation of it—the designer(s) of the integrated circuit, the designer(s) of the operating system and the designer(s) of the application programs. In an appropriate case, the end user may be given the opportunity to specify which features should be dropped to save power.

The term "modify an algorithm" is to be construed in a general sense, including the omission of steps from an algorithm, omission of the execution of one or more algorithms during the execution of a program, substituting a lower-power algorithm that performs generally the same, changing of algorithm parameters, etc. all of which are understood to constitute adaptation to different power dissipation levels in accordance to the present invention. For example, a power-saving algorithm in a drawing program could, in response to a thermal event, substitute a wire frame model for a fully-rendered version.

Figure 5:
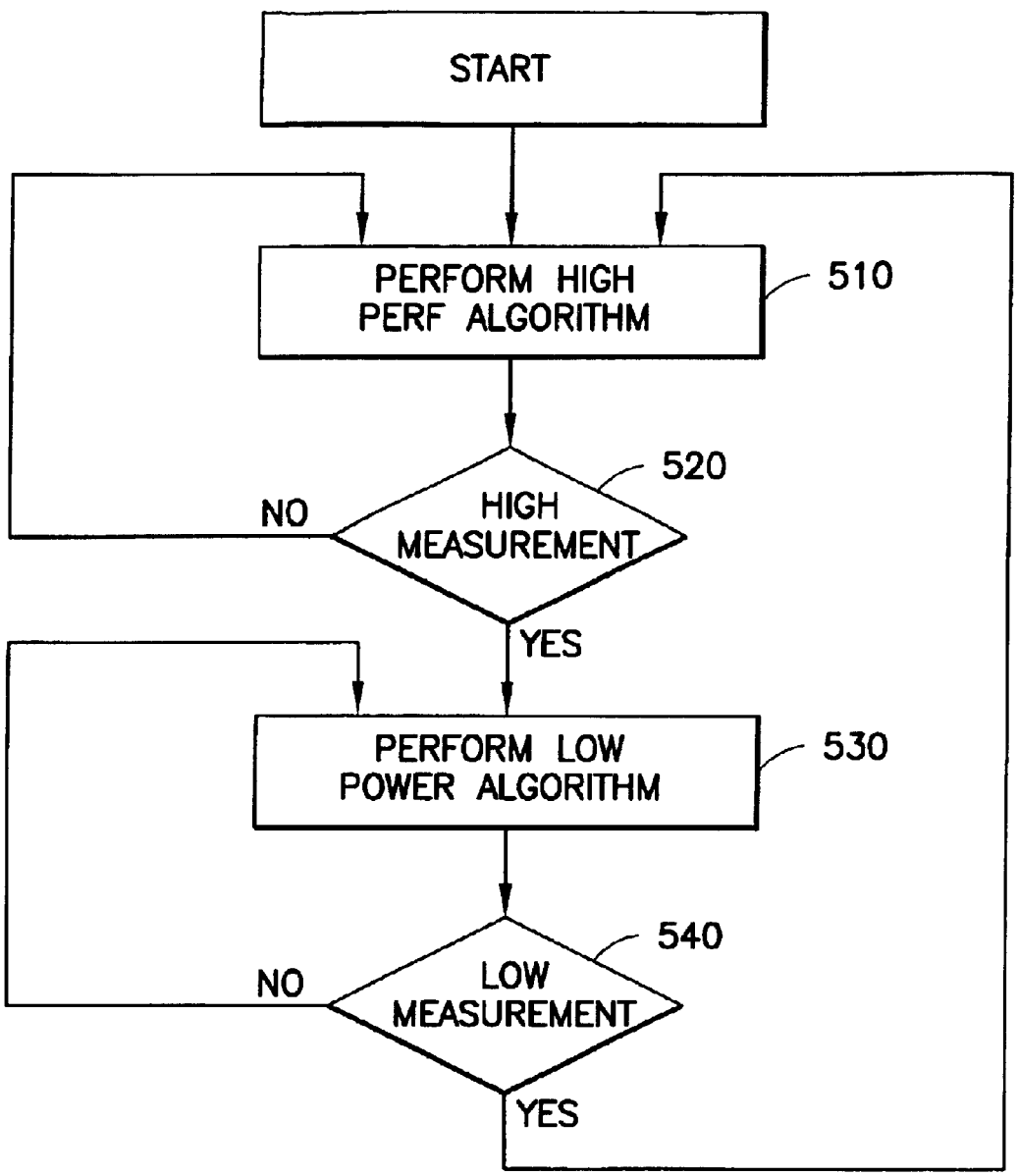
FIG. 5 shows a software approach to adapt power consumption in response to notification events by hardware.

Referring now to FIG. 5, there is shown a first embodiment of software operation in conjunction with a thermal control circuit in accordance with the present invention. The software has been adapted to execute in a first performance-optimized and a second power-optimized mode of operation in response to notification events of a thermal monitor circuit indicating entrance and exit from critical power-dissipation levels.

Upon system start, software enters processing in step 510. In step 510, the software executes a performance-optimized version of one or more algorithms. In step 520, it is checked whether a notification event indicating critical power-dissipation levels has occurred. If no event is present, then processing continues in step 510. Otherwise, processing transfers to step 530.

In step 530, a power-optimized version of one or more of the employed algorithm (i.e., an algorithm with lower power dissipation) is employed to continue processing. In step 540, it is checked whether a notification event indicating the return to non-critical power levels has occurred. If no event is present, then processing continues in step 530. Otherwise, processing transfers to step 510.

Furthermore, the execution of several steps can occur in parallel, in particular, but not limited to, those steps having to do with the execution of an algorithm and the monitoring for a notification event. For example, in one embodiment, the monitoring of the notification event can be performed by microprocessor logic in parallel with the processing of instructions when the notification event is implemented as an exception.

"Algorithm" shall be construed in a general sense, including the omission of steps from an algorithm, omission of the execution of one or more algorithms during the execution of a program, changing of algorithm parameters, etc. shall constitute adaptation to different power dissipation levels in accordance to the present invention. In a software application, algorithms can be implemented to provide a variety of operation modes with differing power dissipation levels, e.g., algorithms implementing a performance optimized mode, a high-resolution mode, a user-friendly mode, a mode presenting a particularly desirable user experience in video game play, and one or more modes optimized for low power operation.

Figure 6:
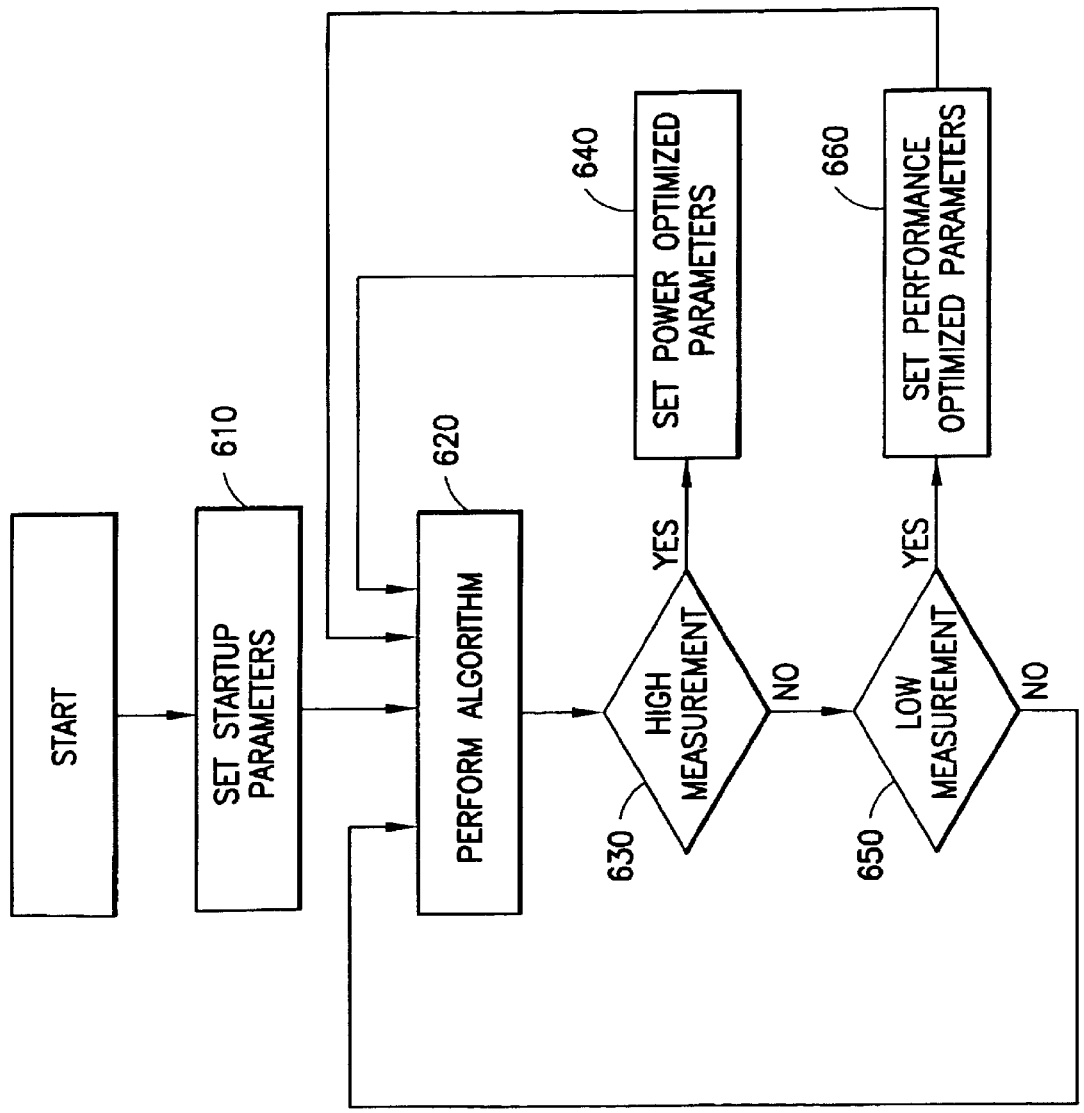
FIG. 6 shows another software approach.

Referring now to FIG. 6, there is shown a second embodiment of software operation in conjunction with a thermal control circuit in accordance with the present invention. The software has been adapted to execute one or more algorithms which have been designed to be guided by a set of configuration parameters which can affect the power dissipation, e.g., the resolution of images drawn, the number of frames drawn per second, etc.

Upon system start, software enters processing in step 610. In step 610, system initializes the start-up parameters. In step 620, the system performs one or more algorithms under the control of start-up parameters that have been previously determined.

In step 630, after a time interval that may be fixed or may be adaptable in response to CPU activity, a test is performed to indicate if a notification event indicating a high measurement has occurred. If an event has occurred, control transfers to step 640. Otherwise, control transfers to step 650.

In step 640, a high measurement (measurement of high power dissipation or high temperature) notification event has occurred and the parameters for the one or more algorithms executed by step 620 are updated to induce these algorithms to execute in a manner dissipating less power and thereby generating less heat. Processing then continues in step 620 with its low-power parameters.

Step 650 is reached after the system has entered low-power mode. There, a test is performed to indicate if a notification event indicating a low measurement (of power or temperature) has occurred. If an event has occurred, control transfers to step 660. Otherwise, the parameters for the algorithms performed in step 620 remain unmodified, and processing continues in step 620.

In step 660, a low measurement notification event has occurred indicating that higher power-dissipating parameters can again be used, and the parameters for the one or more algorithms executed by step 620 are updated to induce these algorithms to execute in a manner exhibiting one or more desirable characteristics, such as higher image resolution, higher frame rate, higher performance, etc. Processing then continues with step 620.

It will be evident to those skilled in the art that the present invention can be practiced in the presence of an operating system. In particular, an operating system can receive the notification events and (1) correlate notification events with processes (or threads, or other abstraction mechanism as appropriate), and provide appropriate notification to such process, or (2) operate as the primary software layer which adapts to the power/thermal dissipation notification events in accordance with the embodiments of FIGS. 4 and 5, modifying its own algorithms and parameters (such as, but not limited to, resource allocation, scheduling policies, etc.), or (3) perform a combination of both. As an example of such modification, operating system software may also use "duty cycles" wherein at least a first and a second process (or thread) are scheduled such that the aggregate power/thermal dissipation falls under the acceptable operating range.

Although the invention has been described with respect to a limited number of embodiments, those skilled in the art will appreciate that other embodiments may be constructed within the spirit and scope of the following claims.

We claim:

1. A computer system comprising an integrated circuit CPU, and at least one software program, in which said CPU includes sensor means responsive to a thermal property of said integrated circuit for asserting a first notification event; and said software program includes instruction means responsive to said first notification event for substituting at least one corresponding power-saving algorithm for an algorithm executed by said software program to reduce the thermal load imposed by said software program on said CPU.

2. A computer system according to claim 1, further comprising means within said CPU for asserting a second notification event when said thermal property exceeds a second limit.

3. A computer system according to claim 2, in which said second limit is greater than said first limit; and further comprising means for providing a hardware-based thermal management solution in response to said second notification event.

4. A computer system according to claim 1, in which said instruction means are included within operating system software.

5. A computer system according to claim 4, in which said operating system software modifies the execution of at least one operating application program in response to said first notification event.

6. A computer system according to claim 4, in which said power-saving algorithm affects a scheduling of at least one resource on a unit of said integrated circuit CPU to reduce said thermal load.

7. A computer system according to claim 4, in which said power-saving algorithm affects a region on said integrated circuit CPU in which said power-saving algorithm runs.

8. A computer system according to claim 1, in which said instruction means are included within application software.

9. A method of operating a computer system comprising an integrated circuit CPU and at least one software program, in which said CPU includes sensor means responsive to a thermal property of said integrated circuit for asserting a first notification event, comprising the steps of:

sensing a parameter representing said first notification event;

substituting at least one corresponding power-saving algorithm executed by said software program for an algorithm that reduces the thermal load imposed by said software program on said CPU in response to said assertion of a first notification event; and restoring said original step in response to the withdrawal of said assertion of a first notification event.

10. A method according to claim 9, in which said substitute step suspends the operation of at least one application program.

11. A method according to claim 9, in which said substitute step substitutes at least one power-saving parameter in an algorithm for a corresponding parameter.

12. A method according to claim 9, in which said substitute step suspends the operation of at least one algorithm in an application program.

13. A method according to claim 9, in which said assertion of a first notification event is in the form of setting a value of said parameter and further comprising a step of comparing said parameter with a first reference value; and modifying said method executed by said software program by the substitution for said original step of a first substitute step that reduces the thermal load imposed by said software program on said CPU when said value of said parameter exceeds said first value.

14. A method according to claim 13, further comprising a step of comparing said parameter with a first restoring reference value; and modifying said method executed by said software program by the replacement of said original step when said value of said parameter is less than said first restoring reference value.

15. A method according to claim 13, further comprising a step of comparing said parameter with a second reference value; and modifying said method executed by said software program by the substitution for said first substitute step of a second substitute step that further reduces said thermal load imposed by said software program on said CPU when said value of said parameter passes said second reference value.

16. A method according to claim 15, further comprising a step of comparing said parameter with a second restoring reference value; and modifying said method executed by said software program by the replacement of said second substitute step with said first substitute step when said value of said parameter is less than said second restoring reference value.

17. A method of operating a computer system comprising an integrated circuit CPU and at least one software program, in which said CPU includes sensor means responsive to a thermal property of said integrated circuit for asserting a first notification event, comprising the steps of:

sensing a parameter representing said first notification event;

modifying a method executed by said software program by the substitution for an original step of at least one substitute step that reduces the thermal load imposed by said software program on said CPU in response to said assertion of a first notification event; and restoring said original step in response to the withdrawal of said assertion of a first notification event wherein said original step is restored automatically after the passage of a time-out interval.

18. An article of manufacture for use in a computer system having an integrated circuit CPU having sensor means responsive to a thermal property of said integrated circuit for asserting a first notification event, comprising a software program storage medium readable by a computer and embodying instructions executable by the computer for performing a method comprising the steps of:

sensing a parameter representing said first notification event;

modifying said method executed by said software program by the substitution for an original step of at least one substitute step that reduces the thermal load imposed by said software program on said CPU in response to said assertion of a first notification event; and restoring said original step in response to the withdrawal of said assertion of a first notification event wherein modifying said method comprises substituting at least one corresponding power-saving algorithm for an algorithm.

19. An article of manufacture according to claim 18, in which said substitute step suspends the operation of at least one application program.

20. An article of manufacture according to claim 18, in which said substitute step substitutes at least one power-saving parameter in an algorithm for a corresponding parameter.

21. An article of manufacture according to claim 18, in which said substitute step suspends the operation of at least one algorithm in an application program.

22. An article of manufacture according to claim 18, in which said assertion of a first notification event is in the form of setting a value of a parameter and further comprising a step of comparing said parameter with a first reference value; and modifying said method executed by said software program by the substitution for said original step of a first substitute step that reduces the thermal load imposed by said software program on said CPU when said value of said parameter exceeds said first reference value.

23. An article of manufacture according to claim 22, further comprising a step of comparing said parameter with a first restoring reference value; and modifying said method executed by said software program by the replacement of said original step when said value of said parameter is less than said first restoring reference value.

24. An article of manufacture according to claim 22, further comprising a step of comparing said parameter with a second reference value; and modifying said method executed by said software program by the substitution for said first substitute step of a second substitute step that further reduces said thermal load imposed by said software program on said CPU when said value of said parameter passes said second reference value.

25. An article of manufacture according to claim 24, further comprising a step of comparing said parameter with a second restoring reference value; and modifying said method executed by said software program by the replacement of said second substitute step with said first substitute step when said value of said parameter is less than said second restoring reference value.

26. An article of manufacture for use in a computer system having an integrated circuit CPU having sensor means responsive to a thermal property of said integrated circuit for asserting a first notification event, comprising a software program storage medium readable by a computer and embodying instructions executable by the computer for performing a method comprising the steps of:

sensing a parameter representing said first notification event; modifying said method executed by said software program by the substitution for an original step of at least one substitute step that reduces the thermal load imposed by said software program on said CPU in response to said assertion of a first notification event; and restoring said original step in response to the withdrawal of said assertion of a first notification event wherein said original step is restored automatically after the passage of a time-out interval.

* * * * *

UNITED STATES PATENT AND TRADEMARK OFFICE
CERTIFICATE OF CORRECTION

PATENT NO. : 6,948,082 B2 Page 1 of 1
DATED : September 20, 2005
INVENTOR(S) : Gschwind et al.

It is certified that error appears in the above-identified patent and that said Letters Patent is hereby corrected as shown below:

Column 10,
Line 51, -- reference -- should be inserted between "first value".

Signed and Sealed this

Thirteenth Day of December, 2005

JON W. DUDAS
*Director of the United States Patent and Trademark Office*